United States Patent [19]

Miyamoto et al.

[11] Patent Number: 5,607,732

[45] Date of Patent: Mar. 4, 1997

[54] TREATING METHOD FOR ALIGNING LIQUID CRYSTAL MOLECULES AND LIQUID CRYSTAL DISPLAY DEVICE

[75] Inventors: Yoshio Miyamoto; Hideyuki Endo, both of Funabashi; Toyohiko Abe, Tokyo, all of Japan

[73] Assignee: Nissan Chemical Industries, Ltd., Tokyo, Japan

[21] Appl. No.: 529,456

[22] Filed: Sep. 18, 1995

[30] Foreign Application Priority Data

Sep. 30, 1994 [JP] Japan .................................... 6-236812

[51] Int. Cl.$^6$ ................................................ G02F 1/3337
[52] U.S. Cl. ................................ 428/1; 349/124; 349/132
[58] Field of Search ................................ 428/1; 359/76, 359/75, 78

[56] References Cited

U.S. PATENT DOCUMENTS 4,877,718  10/1989  Moore et al. ............................ 430/326
5,053,480  10/1991  Koto et al. ............................... 528/188

FOREIGN PATENT DOCUMENTS 61-47932  3/1986  Japan .
2-2515    1/1990  Japan .

*Primary Examiner*—Alexander Thomas
*Attorney, Agent, or Firm*—Oblon, Spivak, McClelland, Maier & Neustadt, P.C.

[57] ABSTRACT

A treating method for aligning liquid crystal molecules, which comprises forming on a substrate a polyimide film represented by a repeating unit of the formula (I):

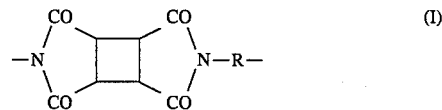

wherein R is a bivalent organic group, irradiating the film with ultraviolet rays having a spatial distribution of irradiation intensity through a mask, immersing it in a developing liquid and then in a rinsing liquid to form periodical concaves and convexes on the surface of the polyimide film, and aligning liquid crystal molecules on the concave-convex surface.

6 Claims, 2 Drawing Sheets

TREATING METHOD FOR ALIGNING LIQUID CRYSTAL MOLECULES AND LIQUID CRYSTAL DISPLAY DEVICE

The present invention relates to a treating method for aligning liquid crystal molecules and a liquid crystal display device employing it. More particularly, it relates to a treating method for aligning liquid crystal molecules, which is capable of aligning liquid crystal molecules without rubbing treatment and which is excellent in the productivity from the industrial viewpoint, and a liquid crystal display device employing it.

A liquid crystal display device is a display device utilizing an electrooptical change of liquid crystal, and as a device, it is small in size and light in weight and has a characteristic such that the power consumption is small. By virtue of such characteristics, it has been developed remarkably in recent years as a display device for various displays. Among them, a twisted nematic type (TN type) field-effect liquid crystal display device is a typical example, wherein nematic liquid crystal having a positive dielectric anisotropy is used, and liquid crystal molecules are aligned in parallel with substrates at the respective interfaces of the opposing pair of electrode substrates, and the two substrates are assembled so that the aligning directions of the liquid crystal molecules are mutually perpendicular to each other. With such a TN liquid crystal display device, it is important that the long axial directions of liquid crystal molecules are uniformly aligned in parallel with the surface of the substrates. Heretofore, two methods are known as typical alignment treatment methods for aligning liquid crystal molecules.

The first method is a method wherein an inorganic substance such as silicon oxide is vapor-deposited obliquely on a substrate to form an inorganic film on the substrate, so that the liquid crystal molecules are aligned in the direction of vapor-deposition. By this method, stabilized alignment can surely be obtained. However, the efficiency is poor from the viewpoint of obtaining uniform alignment over the entire surface of a large size substrate, and this method is merely used on an industrial scale.

The second method is a method wherein an organic coating film is formed on a substrate surface, and its surface is rubbed in a certain direction with a cloth of e.g. cotton, nylon, polyester or the like, so that the liquid crystal molecules will be aligned in the rubbing direction. By this method, stabilized uniform alignment can be obtained relatively easily, and the method is excellent in the productivity. Therefore, this method is most commonly employed for the industrial purpose. As the organic film, polyvinyl alcohol, polyoxyethylene, polyamide or polyimide may, for example, be mentioned. However, polyimide which is chemically and thermally most excellent, is commonly used from the viewpoint such that it has sufficient stability and durability for industrial mass production.

The treating method for alignment by rubbing polyimide was an industrially useful method which is simple and excellent in the productivity. However, as the demand for high performance and sophiscation of the liquid crystal display device has increased more than ever, and new display systems have been developed to meet such demand, various problems have been pointed out with respect to the rubbing method. For example, a STN (supertwisted nematic) system wherein the twist angle of the TN type liquid crystal display device has increased, an AM (active matrix) system wherein switching elements are formed for individual electrodes, respectively, a FLC (ferroelectric) system employing ferroelectric liquid crystal and an AFLC (antiferroelectric) system employing antiferroelectric liquid crystal may, for example, be mentioned. In the STN system, the contrast is high, whereby scratches on the surface of the alignment film caused by rubbing will be display defects. In the AM system, the mechanical force or the static electricity due to rubbing is likely to break the switching elements, or dusts formed by rubbing will be display defects. In the FLC or AFLC system, it will be difficult to attain both a quick response and uniform alignment of smectic liquid crystals solely by simple rubbing treatment. Thus, various problems of the rubbing method have been made clear.

For the purpose of solving such problems, a so-called "rubbingless" alignment method has been studied for aligning liquid crystal molecules without rubbing, and various methods have been proposed. For example, a method wherein photochromic molecules are introduced to the surface of the alignment film so that the molecules at the surface of the alignment film are aligned by light (Japanese Unexamined Patent Publication No. 2844/1992), a method wherein a LB film (a Langmuir-Blodgett film) is used to align molecular chains constituting the alignment film (S. Kobayashi et. al., Jpn. J. Appl. Phys., 27, 475 (1988)), a method wherein alignment is transferred by pressing an alignment film on a substrate which has been subjected to alignment treatment beforehand (Japanese Unexamined Patent Publication No. 43458/1994), have been studied. However, none of them is qualified as a substitute for the rubbing method when the industrial productivity is taken into account.

Whereas, various methods have been proposed wherein periodical concaves and convexes are artificially formed on the surface of an alignment film, so that the liquid crystal molecules are aligned along these concaves and convexes. The simplest method thereof is a method wherein a replica is prepared beforehand which has periodical concaves and convexes, and a thermoplastic film is heated and pressed thereon to transfer the concaves and convexes on the film (Japanese Unexamined patent Publications No. 172320/1992, No. 296820/1992 and No. 311926/1992). By this method, it is certainly possible to efficiently prepare a film having periodical concaves and convexes on its surface. However, it has been impossible to obtain practical reliability attainable by a polyimide film used for the rubbing method. Whereas, a method for forming periodical concaves and convexes on a film surface has been proposed wherein a high energy light such as an electron beam (Japanese Unexamined Patent Publication No. 97130/1992), an α-ray (Japanese Unexamined Patent Publication No. 19836/1990), an X-ray (Japanese Unexamined Patent Publication No. 2515/1990) or excimer laser (Japanese Unexamined Patent Publication No. 53513/1993) is irradiated to the highly reliable polyimide film to form periodical concaves and convexes on the film surface. However, using such a high energy light source can not be regarded as an efficient method for alignment treatment when the industrial productivity is taken into account such that alignment treatment is continuously carried out uniformly over the entire surface of a large size substrate.

On the other hand, a photolithography method may be mentioned as an efficient method for forming periodical convexes and concaves on the surface of a highly reliable polyimide film. Polyimide is used as an insulating film for semiconductors by virtue of the excellent electrical characteristics and the high insulating property. In recent years, a so-called photosensitive polyimide has been developed, whereby the polyimide itself has a photocurable property.

This is an attempt to form periodical concaves and convexes by a photolithography method employing such a photocurable polyimide. By this method, concaves and convexes can surely be formed on the surface of the polyimide film. However, this photocurable polyimide has essentially be developed as an insulating film. Therefore, the characteristics for aligning the liquid crystal molecules are inadequate, and it has become necessary to coat a buffer layer (Japanese Unexamined Patent Publication No. 245224/1992). Consequently, the process became complex, and it can not be an efficient method for alignment treatment which can be a substitute for the rubbing method when the industrial productivity is taken into account.

The present invention has been made to solve these problems, and it is an object of the present invention to provide a method for alignment treatment by an industrially useful method which is simple and excellent in productivity, and a liquid crystal display device employing it.

Namely, the present invention provides a treating method for aligning liquid crystal molecules, which comprises forming on a substrate a polyimide film represented by a repeating unit of the formula (I):

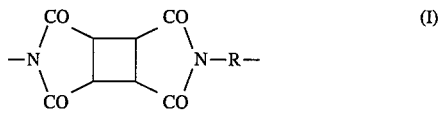

wherein R is a bivalent organic group, irradiating the film with ultraviolet rays having a spatial distribution of irradiation intensity through a mask, immersing it in a developing liquid and then in a rinsing liquid to form periodical concaves and convexes on the surface of the polyimide film, and aligning liquid crystal molecules on the concave-convex surface.

Further, the present invention provides a liquid crystal display device having liquid crystal sandwiched between a pair of substrates having electrodes formed thereon, wherein on at least one of the substrates, a polyimide film represented by a repeating unit of the formula (I):

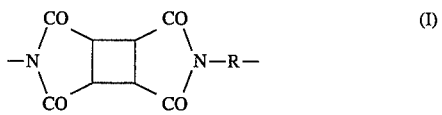

wherein R is a bivalent organic group, is formed, the film is irradiated with ultraviolet rays having a spatial distribution of irradiation intensity through a mask, and then immersed in a developing liquid and then in a rinsing liquid to form periodical concaves and convexes on the surface of the polyimide film, and liquid crystal molecules are aligned on the concave-convex surface.

Figure 1:
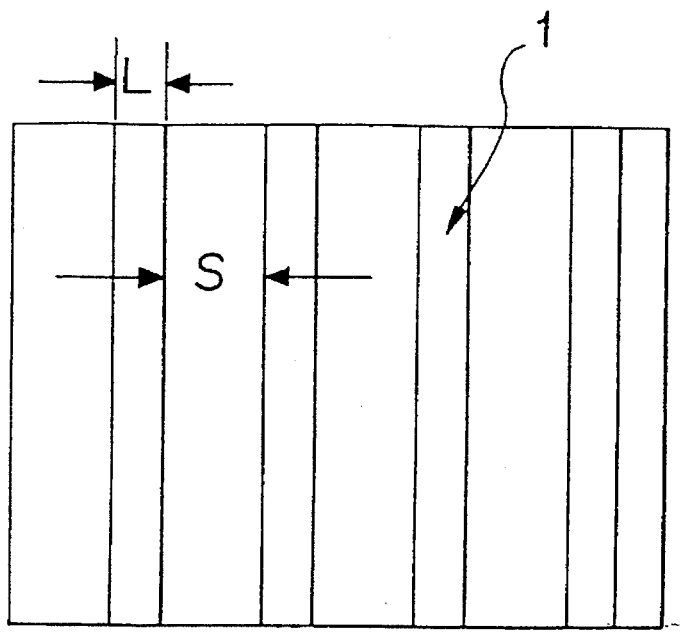
FIG. 1 is a pattern of the mask.

Now, the present invention will be described in detail.

The present inventors have previously discovered that the polyimide of the formula (I) of the present invention is a polyimide which is excellent in the transparency (Japanese Examined Patent Publication No. 11615/1990 which corresponds to U.S. Pat. No. 5,053,480), and when rubbing treatment is applied thereto, and such polyimide is used as a liquid crystal alignment film, it has excellent alignment characteristics (Japanese Examined Patent Publication No. 33010/1992). Further, it has been reported that some of polyimides having a structure of the formula (I) are capable of forming a predetermined pattern by irradiation with ultraviolet rays. (Japanese Unexamined Patent Publication No. 135449/1990 which corresponds to U.S. Pat. No. 4,877,718)

Accordingly, by a simple method wherein ultraviolet rays are irradiated to this polyimide, followed by immersion in a developing liquid and then in a rinsing liquid, it is possible to form periodical concaves and convexes on the surface and to align liquid crystal molecules on such concave-convex surface, whereby it is possible to obtain highly reliable alignment durable for practical use without carrying out rubbing treatment.

The polyimide of the formula (I) can be obtained by the method disclosed in Japanese Examined Patent Publication No. 11615/1990 (which corresponds to U.S. Pat. No. 5,053,480). Namely, 1,2,3,4-cyclobutanetetracarboxylic dianhydride and a diamine are subjected to a polycondensation reaction in a solvent at an optional molar ratio of from 0.5 to 2, preferably from 0.9 to 1.1 to obtain a polyimide precursor (polyamic acid), which is converted to an imide. The diamine used here is usually an aromatic diamine, preferably an aromatic diamine having a hetero atom. As specific examples thereof, diaminodiphenyl ether, 1,4-bis(4-aminophenoxy)benzene, 4,4'-bis(4-aminophenoxy)diphenylsulfone, 2,2-bis[4-(4-aminophenoxy)phenyl]propane and 4,4'-diaminodiphenylsulfone may be mentioned as typical examples.

Namely, as the polyimide to be used in the present invention, it is preferred that in the polyimide of the formula (I), the bivalent organic group R is an aromatic hydrocarbon group. Further, the aromatic hydrocarbon group is preferably an aromatic hydrocarbon group having at least one linking group selected from the group consisting of —SO—, —S—, —SO$_2$—, and —O— as a linking group of an aromatic ring in the aromatic hydrocarbon group, and as the aromatic ring, a benzene ring is preferred.

The temperature for the polycondensation reaction may be selected at an optional level from −20° C. to 150° C. However, the temperature is preferably within a range of −5° C. to 100° C. The solvent for the polymerization is not particularly limited so long as it is capable of dissolving the resulting polyamic acid. Typical examples include N,N-dimethylformamide, N,N-dimethylacetamide, N-methylpyrrolidone, N-methylcaprolactam, dimethylsulfoxide, tetramethylurea, pyridine, dimethylsulfone, hexamethylphosphoramide and butyrolactone. These solvents may be used alone or in combination as a mixture.

Further, even a solvent which does not dissolve the polyamic acid may be added to the above solvent within a range where the polyamic acid is dissolved.

A method for forming a polyimide film by coating the obtained polyamic acid on the substrate, is carried out by the method disclosed in Japanese Examined Patent Publication No. 33010/1992. Namely, a solution of the above-mentioned polyimide precursor is coated on a substrate and then heated to remove the solvent and to subject the polyimide precursor to dehydration ring closure to form a uniform polyimide film on the substrate. This heating temperature can be selected at an optional level of from 150° C. to 400° C.

Further, in a case where the resulting polyimide is soluble in a solvent, a polyimide solution may be coated as it is, and then the solvent may be evaporated to form a polyimide film.

The coating method is not particularly limited, and a method such as dipping, coating, printing or spraying may be employed.

In the present invention, the method of irradiating the polyimide film with ultraviolet rays having a spatial distribution of irradiation intensity through a mask, followed by immersing in a developing liquid and then in a rinsing liquid to form periodical concaves and convexes on the surface of the polyimide film, can be carried out in accordance with a method for forming a patterned insulating layer, as shown in Japanese Unexamined Patent Publication No. 135449/1990 (which Corresponds to U.S. Pat. No. 4,877,718). The ultraviolet rays to be irradiated may be from any light source so long as the light source has a wavelength region of from 200 nm to 400 nm, and a high pressure mercury lamp, a super high pressure mercury lamp, a xenon lamp and a DrF excimer laser may, for example, be mentioned as typical examples. A high pressure mercury lamp is most common taking into the industrial productivity into consideration.

By applying such ultraviolet rays through a mask having a predetermined pattern, the polyimide film is irradiated with the ultraviolet rays having a spatial distribution of irradiation intensity, whereby soluble exposed regions and non-exposed regions will be formed in the film. The exposed regions are dissolved by a solvent and removed and cleaned to form concaves and convexes on the surface of the polyimide.

An aprotic highly polar organic solvent is preferred as the organic solvent for dissolving and removing the exposed regions i.e. as the developing liquid. Specific examples of such a solvent include N-methyl-2-pyrrolidone, N,N-dimethylformamide, N,N-dimethylacetamide, dimethylsulfoxide, 1,3-dimethyl-2-imidazolidinone, γ-butyrolactone, diacetone alcohol, ethylene glycol monomethyl ether, ethylene glycol monoethyl ether, diethylene glycol monomethyl ether, diethylene glycol monoethyl ether, ethylene glycol monomethyl ether acetate and propylene carbonate. Particularly preferred organic solvents are N-methyl-2-pyrrolidone, N,N-dimethylformamide, N,N-dimethylacetamide, γ-butyrolactone, diacetone alcohol and ethylene glycol monomethyl ether. As the rinsing liquid (cleaning liquid), water is usually employed.

The shape of the concaves and convexes on the surface of the polyimide film can be varied widely depending upon the pattern image of the mask employed, the intensity distribution of the irradiated ultraviolet rays and the developing conditions for dissolving and removing the exposed regions by means of a solvent to develop the pattern image. Further, depending upon the pattern image of the mask, periodical concaves and convexes having different directions in the same plane of the polyimide film, can be formed.

By contacting liquid crystal to the polyimide film having periodical concaves and convexes thus formed on the surface of the film, it is possible to align the liquid crystal molecules along the concaves and convexes.

Now, the present invention will be described in further detail with reference to Examples. However, it should be understood that the present invention is by no means restricted to such specific Examples.

EXAMPLES 1 to 5

Formation of a Polyimide Film 41.0 g (0.1 mol) of 2,2-bis[4-(4-aminophenoxy)phenyl] propane and 19.6 g (0.1 mol) of 1,2,3,4-cyclobutanetetracarboxylic dianhydride were reacted in 343.5 g of N-methylpyrrolidone (hereinafter referred to simply as NMP) at room temperature for 10 hours to obtain a polyimide precursor (polyamic acid) solution. The reduced viscosity of the obtained polyimide precursor was 0.98 dl/g (concentration: 0.5/dl, 30° C. in NMP).

This solution was diluted with NMP to a total solid content of 7 wt % and then spin-coated on a glass substrate of 60 mm×70 mm×1.2 mm at 3,500 rpm and then heat-treated at 80° C. for 10 minutes and at 250° C. for one hour to form a polyimide resin film having a thickness of 1 μm.

Formation of Concaves and Convexes on the Surface of the Film

Two glass substrates coated with polyimide resin films, thus obtained, were prepared. The respective polyimide films were subjected to exposure for the period of time as identified in Table 1 by a high pressure mercury lamp with an output of 300 W through a mask for exposure wherein lines L (exposed portions) and spaces S (light-shielding portions) in slit shapes as identified in FIG. 1 have pattern sizes as identified in Example 1 in Table 1. The substrates treated as described above, were immersed in N-methylpyrrolidone for a predetermined period of time for development and further immersed in pure water for 5 minutes for cleaning. The surface of such substrates was inspected by a scanning electron microscope, whereby periodical concaves and convexes as shown in FIG. 2 were observed on the surface of the polyimide films. The width and the depth of such concaves and convexes were measured by stylus method (Talystep), whereby it was confirmed that stripe patterns as shown in Table 1, which correspond to the respective mask patterns, the exposure and development conditions, were formed on the surface of the polyimide films. In the same manner, Examples 2 to 5 were carried out under the conditions as identified in Table 1.

Figure 2:
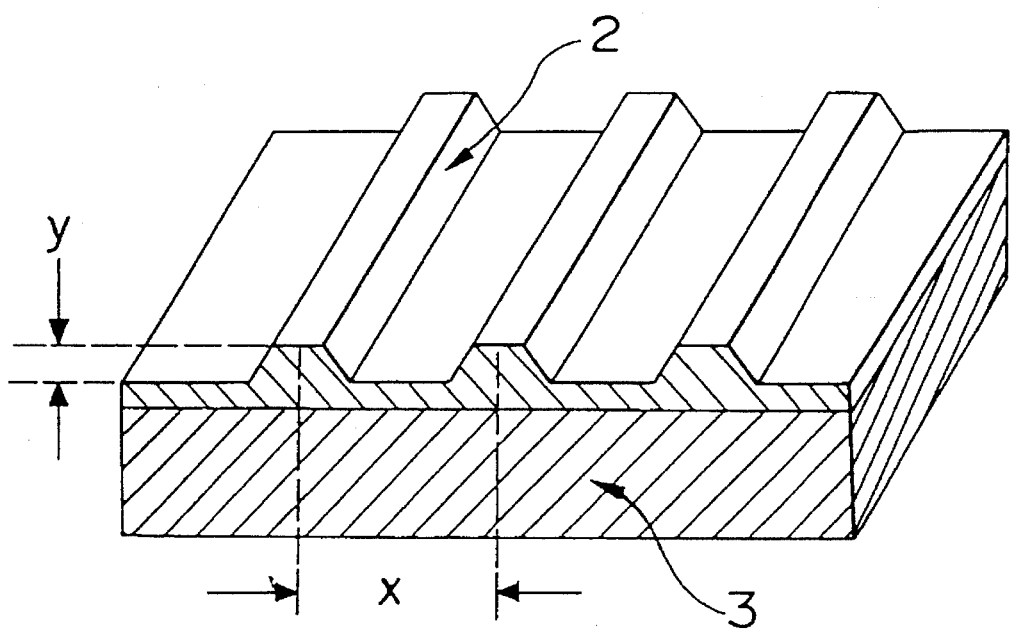
FIG. 2 is a diagrammatical view showing the periodical concaves and convexes on the surface of the polyimide film as observed by an electron microscope.

Referring to FIGS. 1 and 2, reference numeral 1 indicates the light-shielding portion, numeral 2 the polyimide film, numeral 3 the glass substrate, symbol L the width of the light-shielding portion, symbol S the width of the exposed portion, symbol x the distance between adjacent convexes, and symbol y the height of the convexes.

Alignment of Liquid Crystal Molecules

Figure 3:
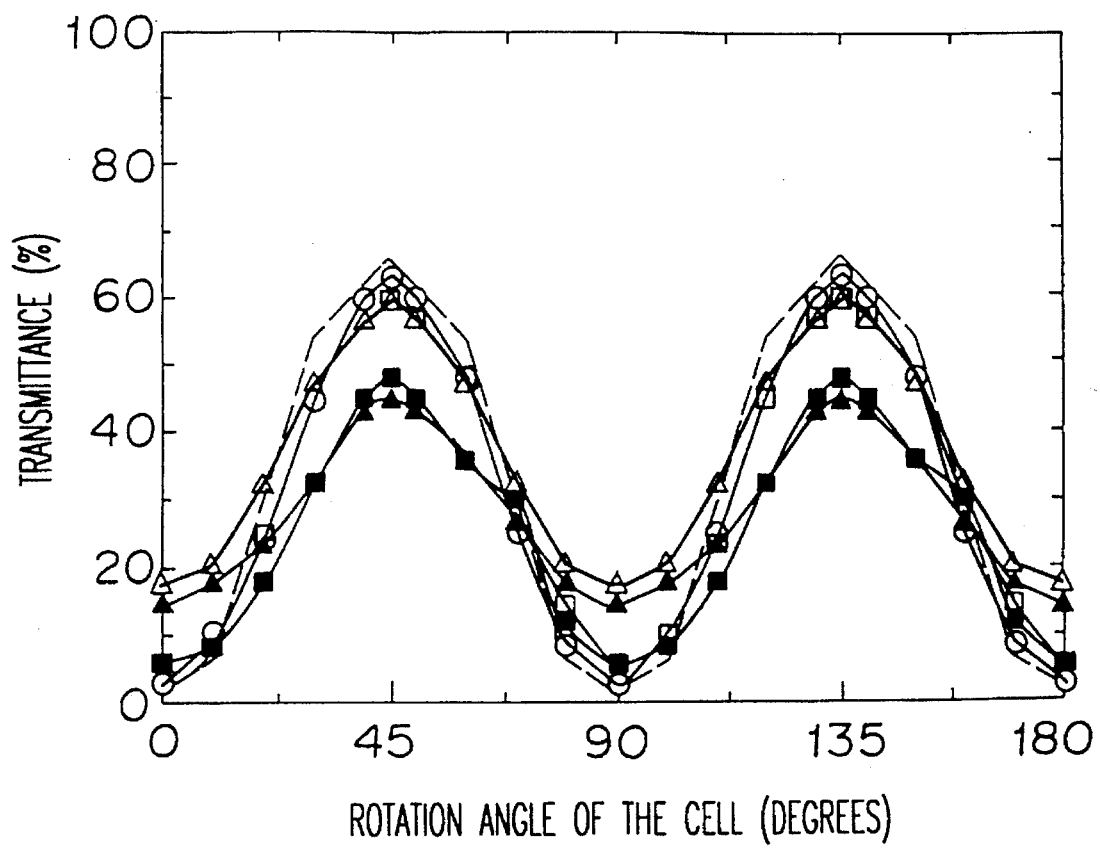
FIG. 3 is a graph of characteristics showing the change of the transmittance by rotation of a liquid crystal cell.

Two substrates having the stripe patterns formed thereon, were joined to each other with a spacer of 6 μm interposed, so that the respective polyimide sides face inside and the directions of stripes would be in parallel to each other, to obtain a cell, and liquid crystal (ZLI-2293, manufactured by Merck Co.) was injected under vacuum. This cell was rotated under crossed Nicols of a polarization microscope, whereby the difference of brightness and darkness as shown in FIG. 3 was observed. From this difference of brightness and darkness, the liquid crystal alignment was evaluated. In the same manner, Examples 2 to 5 were carried out under the conditions as identified in Table 1.

COMPARATIVE EXAMPLE 1

In the same manner as in Examples, polyimide films were formed on glass substrates and subjected to rubbing treatment with a nylon cloth without conducting the treatment for forming concaves and convexes on the film surface as in Examples. Then, the liquid crystal alignment was evaluated in the same manner as in Examples, and the results were as shown by the dotted line in FIG. 3.

Referring to FIG. 3, ○ represents Example 1, □ Example 2, △ Example 3, ■ Example 4, ▲ Example 5, and - - - Comparative Example 1.

From these results, it was confirmed that by the treatment for alignment as shown in Examples, alignment equivalent to the one obtained by rubbing treatment as shown in Comparative Example, was obtained.

TABLE 1

| Examples | 1 | 2 | 3 | 4 | 5 |
| --- | --- | --- | --- | --- | --- |
| Initial film thickness (μm) | 1 | 1 | 1 | 1 | 1 |
| Pattern sizes | | | | | |
| L (μm) | 1 | 1 | 1 | 2 | 5 |
| S (μm) | 1 | 2 | 5 | 1 | 1 |
| Exposure period (min) | 30 | 30 | 30 | 30 | 30 |
| Developing period (min) | 20 | 20 | 20 | 20 | 20 |
| Shapes of Concaves and convexes | | | | | |
| x (μm) | 2 | 3 | 6 | 3 | 6 |
| y (μm) | 0.4 | 0.4 | 0.4 | 0.3 | 0.3 |

By treating a polyimide having a certain specific structure by a simple photolithography method, it is possible to obtain highly reliable alignment useful for practical purposes without conducting rubbing treatment.

We claim:

1. A treating method for aligning liquid crystal molecules, which comprises forming on a substrate a polyimide film represented by a repeating unit of the formula (I):

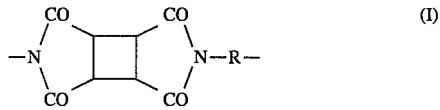

(I)

wherein R is a bivalent organic group, irradiating the film with ultraviolet rays having a spatial distribution of irradiation intensity through a mask, immersing it in a developing liquid and then in a rinsing liquid to form periodical concaves and convexes on the surface of the polyimide film, and aligning liquid crystal molecules on the concave-convex surface.

2. The treating method for aligning liquid crystal molecules according to claim 1, wherein the bivalent organic group R is an aromatic hydrocarbon group.

3. The treating method for aligning liquid crystal molecules according to claim 2, wherein the aromatic hydrocarbon group is an aromatic hydrocarbon group having at least one linking group selected from the group consisting of —SO—, —S—, —SO$_2$— and —O— as a linking group of an aromatic ring.

4. The treating method for aligning liquid crystal molecules according to claim 1, wherein the, developing liquid is an aprotic highly polar organic solvent.

5. The treating method for aligning liquid crystal molecules according to claim 1, wherein the developing liquid is at least one member selected from the group consisting of N-methyl-2-pyrrolidone, N,N-dimethylformamide, N,N-dimethylacetamide, dimethylsulfoxide, 1,3-dimethyl-2-imidazolidinone, γ-butyrolactone, diacetone alcohol, ethylene glycol monomethyl ether, ethylene glycol monoethyl ether, diethylene glycol monomethyl ether, diethylene glycol monoethyl ether, ethylene glycol monomethyl ether acetate and propylene carbonate.

6. A liquid crystal display device having liquid crystal sandwiched between a pair of substrates having electrodes formed thereon, wherein on at least one of the substrates, a polyimide film represented by a repeating unit of the formula (I):

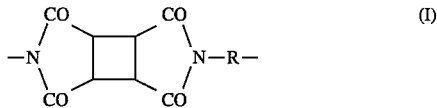

(I)

wherein R is a bivalent organic group, is formed, the film is irradiated with ultraviolet rays having a spatial distribution of irradiation intensity through a mask, and then immersed in a developing liquid and then in a rinsing liquid to form periodical concaves and convexes on the surface of the polyimide film, and liquid crystal molecules are aligned on the concave-convex surface.

* * * * *